Dec. 16, 1969   J. T. BAILEY   3,484,672

MOTOR REVERSING CIRCUIT

Filed Sept. 25, 1967

INVENTOR
John T. Bailey

Donald F. Dalton
Attorney

United States Patent Office 3,484,672
Patented Dec. 16, 1969

3,484,672
MOTOR REVERSING CIRCUIT
John T. Bailey, Middletown Township, Bucks County, Pa., assignor to United States Steel Corporation, a corporation of Delaware
Filed Sept. 25, 1967, Ser. No. 670,350
Int. Cl. H02p 7/10
U.S. Cl. 318—251                    4 Claims

ABSTRACT OF THE DISCLOSURE

A direct current motor mounted on moving equipment is controlled from a remote location through collector rails and shoes. When the polarity of the direct current power source is reversed the direction of rotation of the motor is also reversed by a motor mounted relay and diode combination reversing the connections to the field winding of the motor.

---

This invention relates to a motor reversing circuit and more particularly to a circuit for reversing the direction of rotation of a direct current series or compound motor mounted on transfer cars, cranes or the like, and controlled from a remote location through collector rails and shoes.

In such equipment of which I have knowledge it is necessary to use one pair of collector rails and shoes to energize the motor armature and another pair of collector rails and shoes to control the direction of rotation of the motor by reversing the polarity of the motor field winding. Reversing and control circuitry are at a control location connected to the collector rails.

It is an object of my invention to provide a motor reversing circuit for a direct current motor which permits rotation of the motor to be controlled from a remote location with a single pair of collector rails and shoes.

Another object is to provide such apparatus which eliminates two leads from a control board to a motor when collector rails and shoes are in use.

Figure 1:
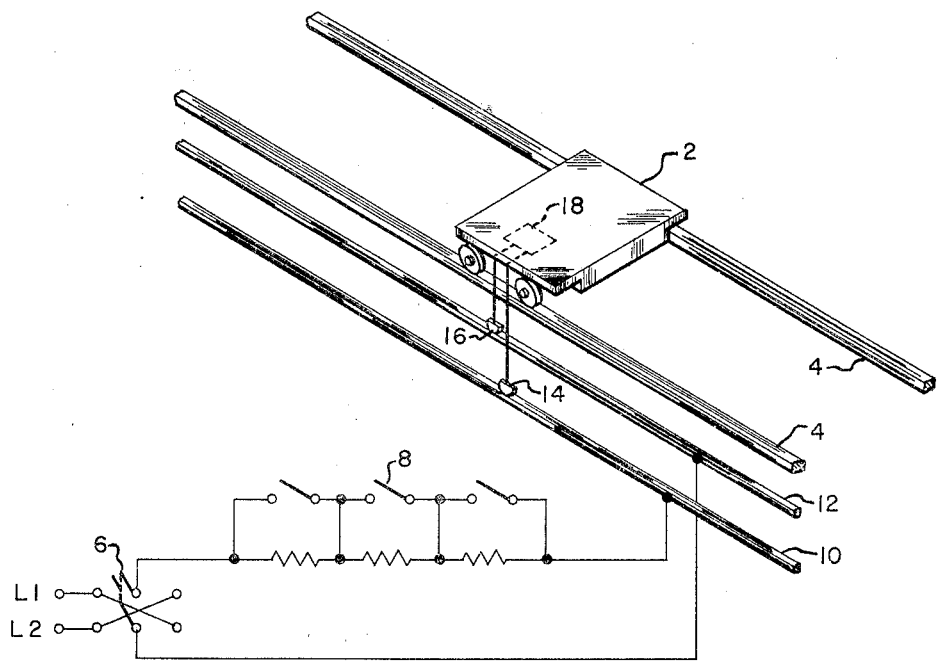
Figure 2:
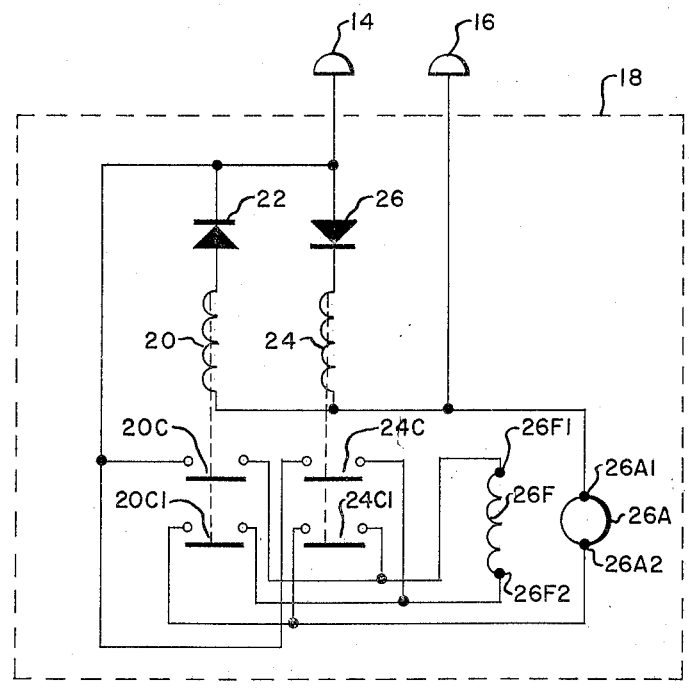

These and other objects will be more apparent after referring to the following specification and attached drawings, in which:

FIGURE 1 is a schematic view of a remotely controlled transfer car and the control of my invention; and FIGURE 2 is a schematic wiring diagram of the motor and controls of my invention.

Referring more particularly to the drawings, reference numeral 2 indicates a remotely controlled transfer car operating on rails 4. A direct current power source L1, L2 is connected through a reversing switch 6 and a conventional speed control 8 to collector rails 10 and 12. Collector shoes 14 and 16 mounted on transfer car 2 are in movable contact with rails 10 and 12, respectively, and are connected to a drive motor and control apparatus 18, also mounted on transfer car 2. In a conventional transfer car system two additional collector rails and shoes are required for reversing the direction of rotation of the drive motor. In such a system the reversing switch controls direction of current to the field supplied through the additional rails.

A relay coil 20 is connected in series with a diode 22 across collector shoes 14 and 16. A second relay coil 24 is connected in series with a second diode 26 in opposite polarity from diode 22 across collector shoes 14 and 16. Relay coil 20 operates two pairs of normally open contacts 20C and 20C1. Relay coil 24 operates two pairs of normally open contacts 24C and 24C1.

The motor includes an armature 26A with terminals 26A1 and 26A2 and a field winding 26F with terminals 26F1 and 26F2. Motor field winding 26F and motor armature 26A are arranged for series operation. Collector shoe 14 is connected to field winding terminal 26F1 through contacts 20C and to field winding terminal 26F2 through contacts 24C. Terminal 26A1 of armature 26A is connected to collector shoe 16 and terminal 26A2 of armature 26A is connected to field winding terminal 26F1 through contacts 24C1 and to field winding terminal 26F2 through contacts 20C1.

When reversing switch 6 is closed in one position, either relay 20 or relay 24 will be energized depending upon the polarity of the power source and the diodes 22 and 26. Field winding 26F and the armature 26A will then be energized and the motor will rotate. When reversing switch 6 is closed then in the opposite position, the flow of current through the armature 26A will be reversed, but the flow of current will be in the same direction through field winding 26F since relays 20 and 24 reverse their on-off positions. The motor will then rotate in the opposite direction.

While the motor field winding 26F and motor armature 26A are arranged for series operation it is apparent that the circuit may be readily adapted to a direct current motor with a shunt field.

If a relay fails to operate due to an open circuit in the relay coil, the circuit provides a safety feature since the relay contacts would then open, stopping the transfer car.

While one embodiment of my invention has been shown and described, it will be apparent that other adaptations and modifications may be made without departing from the scope of the following claims.

I claim:

1. Apparatus for reversing the direction of rotation of a direct current motor when the relative polarity of the power source is reversed comprising: a reversible polarity source of direct current power having first and second output terminals; a field winding for said motor having a first terminal and a second terminal; and armature for said motor having first and second input terminals, said second input terminal being connected to said second output terminal; rectifier means; relay means connected across said output terminals in series with said rectifier means, said relay means having a first and second pair of contacts closed when said power source has a first relative polarity and a third and fourth pair of contacts closed when said power source has the opposite relative polarity; means connecting said first output terminal to said first field terminal through said first pair of contacts and connecting said first input terminal of said armature to said second field terminal through said second pair of contacts; and means connecting said first output terminal to said second field terminal through said third pair of contacts and connecting said first input terminal of said armature to said first field terminal through said fourth pair of contacts.

2. Apparatus according to claim 1 in which said relay means includes a first relay coil for operating the said first and second pair of contacts, and a second relay coil for operating the said third and fourth contacts, all of said contacts being normally open; and said rectifier means includes a first diode connected in a first polarity between the first relay coil and the first output terminal, and a second diode connected in the opposite polarity between the second relay coil and the first output terminal.

3. Apparatus according to claim 1 including movable equipment carrying the motor, rectifier means and relay means and driven by the motor and in which the connection from the second output terminal to the second input terminal and the connecting means includes a first collector rail connected to the first output terminal, a second collector rail connected to the second output terminal, a first collector shoe mounted on said equipment in movable contact with the first collector rail and connected to the rectifier means and the relay means, and a second collector shoe mounted on said equipment in movable contact with the second collector rail and connected to the relay means and the second input terminal.

4. Apparatus according to claim 3 in which said relay means includes a first relay coil for operating the said first and second pair of contacts normally open, and a second relay coil for operating the said third and fourth contacts, all of said contacts being normally open; and said rectifier means includes a first diode connected in a first polarity between the first relay coil and the first collector shoe, and a second diode connected in the opposite polarity between the second relay coil and the first collector shoe.

References Cited

UNITED STATES PATENTS

| | | | |
|---|---|---|---|
| 1,805,160 | 5/1931 | Bivens | 318—293 |
| 3,070,732 | 12/1962 | Crandall et al. | 318—293 |
| 3,097,875 | 7/1963 | Kaplan | 318—293 |

ORIS L. RADER, Primary Examiner

K. L. CROSSON, Assistant Examiner

U.S. Cl. X.R.

318—293